United States Patent [19]

Corder

[11] 4,172,796
[45] Oct. 30, 1979

[54] WATER PURIFIER APPARATUS

[75] Inventor: Thomas E. Corder, Ft. Collins, Colo.

[73] Assignee: Teledyne Industries, Inc. d/b/a Teledyne Water Pik, Ft. Collins, Colo.

[21] Appl. No.: 691,830

[22] Filed: Jun. 1, 1976

Related U.S. Application Data

[63] Continuation-in-part of Ser. No. 617,449, Sep. 29, 1975, abandoned.

[51] Int. Cl.$^2$ .................... B01D 35/02; B01D 29/38
[52] U.S. Cl. .................................. 210/238; 210/281; 210/282; 210/424; 210/439; 210/501; 137/625.47
[58] Field of Search .................... 137/625.47; 210/232, 210/238, 281, 282, 424, 440, 443, 501, 439

[56] References Cited

U.S. PATENT DOCUMENTS

| | | | |
|---|---|---|---|
| 471,840 | 3/1892 | Blessing | 137/625.47 X |
| 1,294,164 | 2/1919 | Ramsey | 210/282 X |
| 3,204,770 | 9/1965 | Brink | 210/282 |
| 3,208,595 | 9/1965 | Butler | 210/282 |
| 3,342,335 | 9/1967 | Gamundi et al. | 210/282 X |
| 3,519,134 | 7/1970 | Hassinger | 210/282 |
| 3,653,514 | 4/1972 | Holler et al. | 210/424 X |
| 3,720,233 | 3/1973 | Shur et al. | 137/625.47 X |
| 3,741,394 | 6/1973 | Defenbaugh | 210/282 |
| 3,746,174 | 7/1973 | Watanabe et al. | 210/282 |
| 3,802,563 | 4/1974 | Sasaki et al. | 210/424 X |

Primary Examiner—Robert H. Spitzer
Attorney, Agent, or Firm—Hugh H. Drake

[57] ABSTRACT

A water purification device includes a housing having a base portion and a generally-cylindrical cup-shaped cap removably secured thereto. An input fluid channel in the base portion communicates with one end of the chamber defined by the cup and an outlet fluid channel communicates with that chamber end. A filter cartridge disposed within the cap has a conduit that extends between its opposite end walls. Filter material surrounds the conduit. An inlet opening in the cartridge is positioned to communicate with the input fluid channel so as to permit water to flow through the filter material. An outlet opening in the cartridge is arranged to communicate from the filter material to the other end of the aforementioned conduit remote from said outlet channel. The conduit other end is positioned to communicate to the outlet channel. A valve is included in an extension of the base portion in order selectively to control the distribution of water as between an outlet passage and the inlet channel. The valve itself has a bore and corresponding stem which are longitudinally tapered, a recess cut longitudinally into the stem for permitting fluid to flow from an inlet port outwardly from one end of the stem, an inset cut laterally into the stem opposite the aforesaid recess, and a resilient sealing member disposed in a groove cut laterally into the stem and surrounding the inset exclusive of the recess.

3 Claims, 13 Drawing Figures

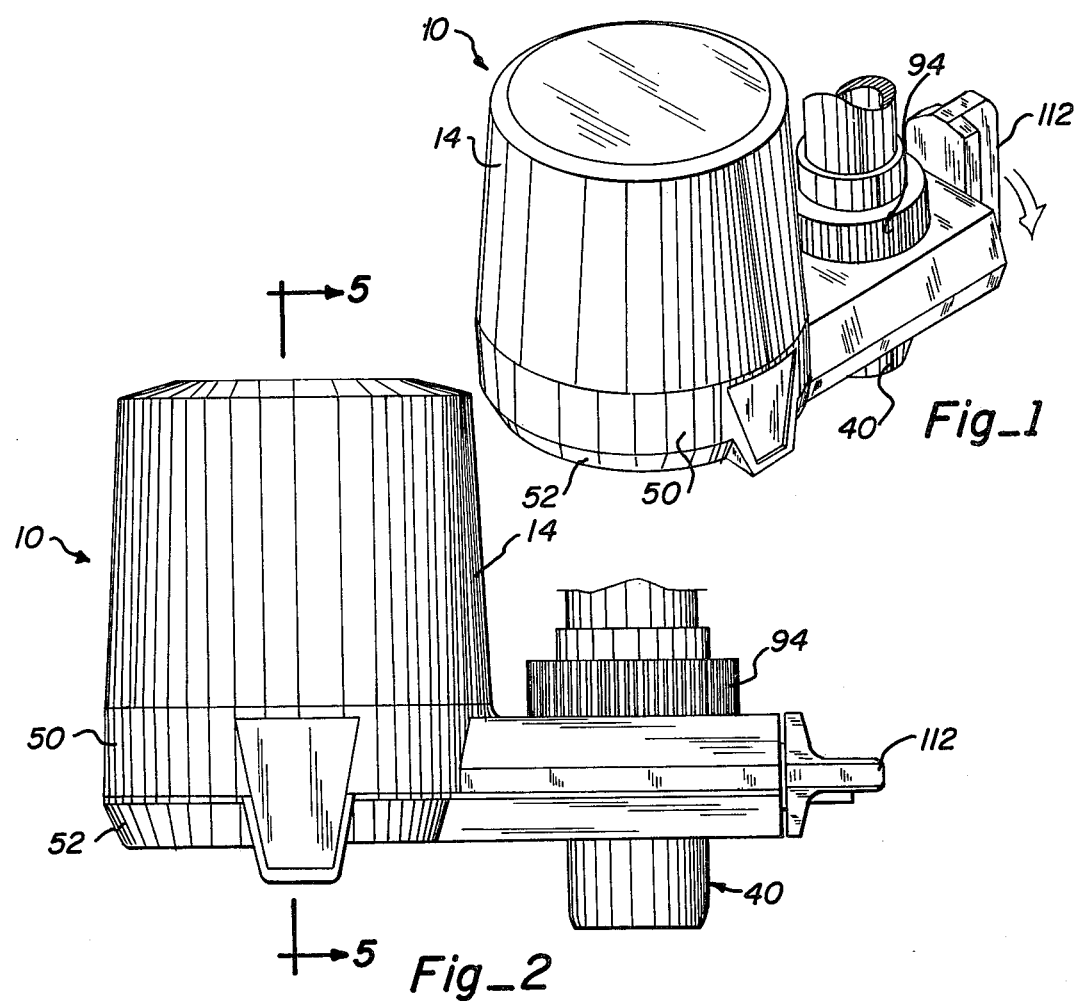
Fig_1
Fig_2
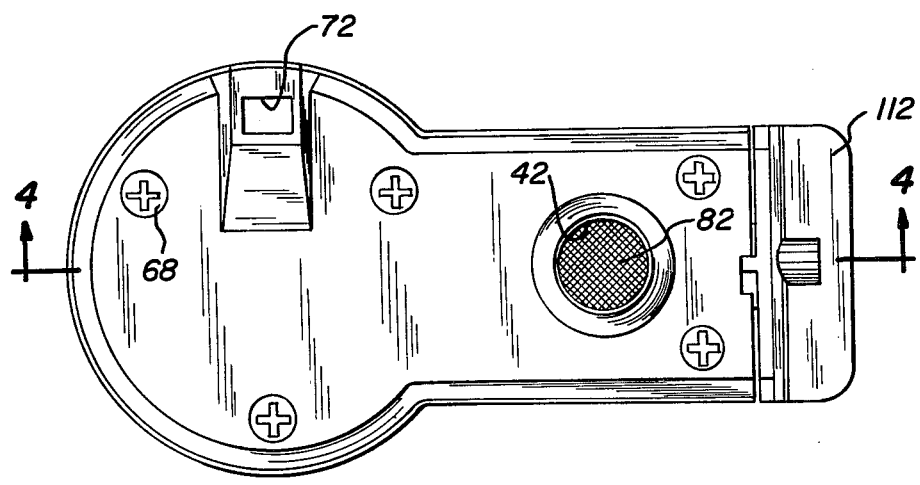
Fig_3

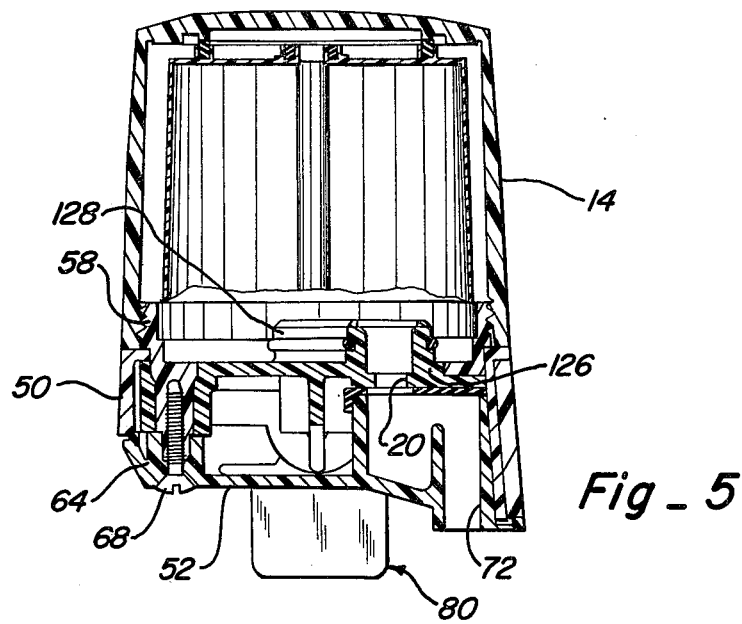
Fig_5
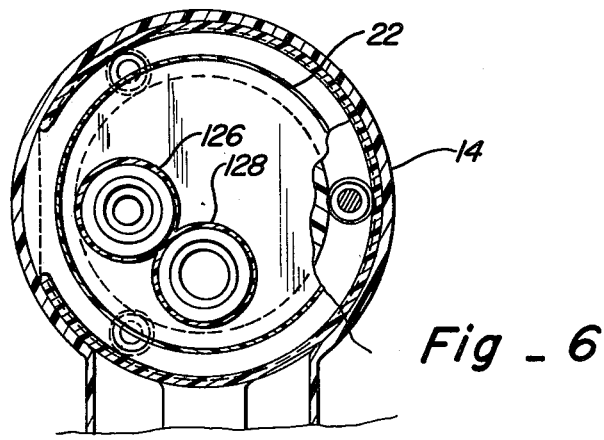
Fig_6

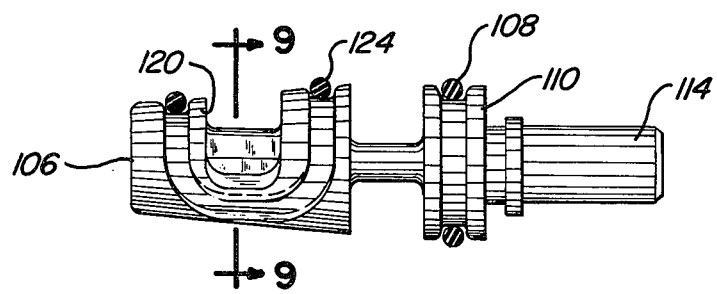
Fig_7
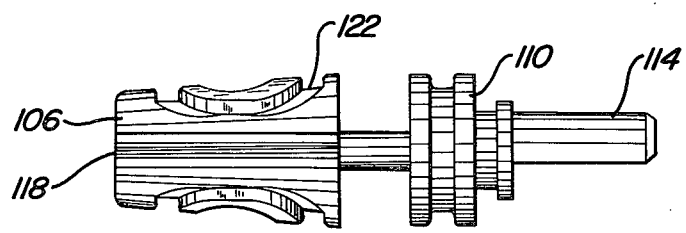
Fig_8
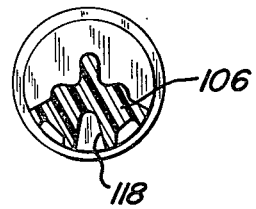
Fig_9
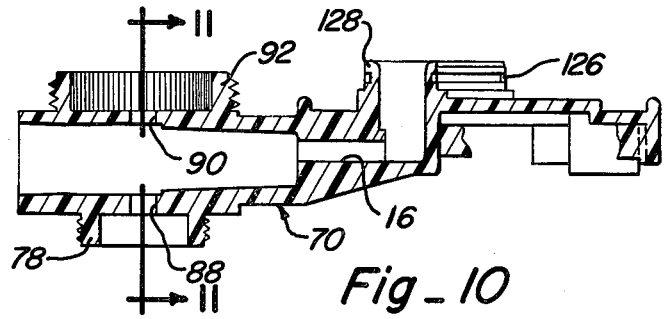
Fig_10
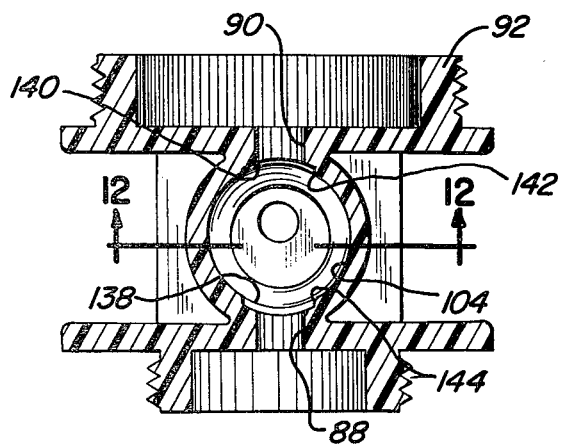
Fig_11
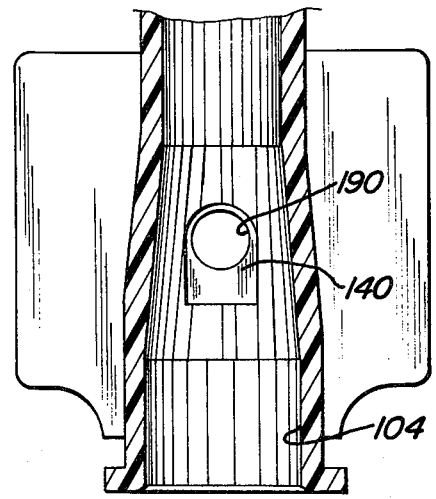
Fig_12

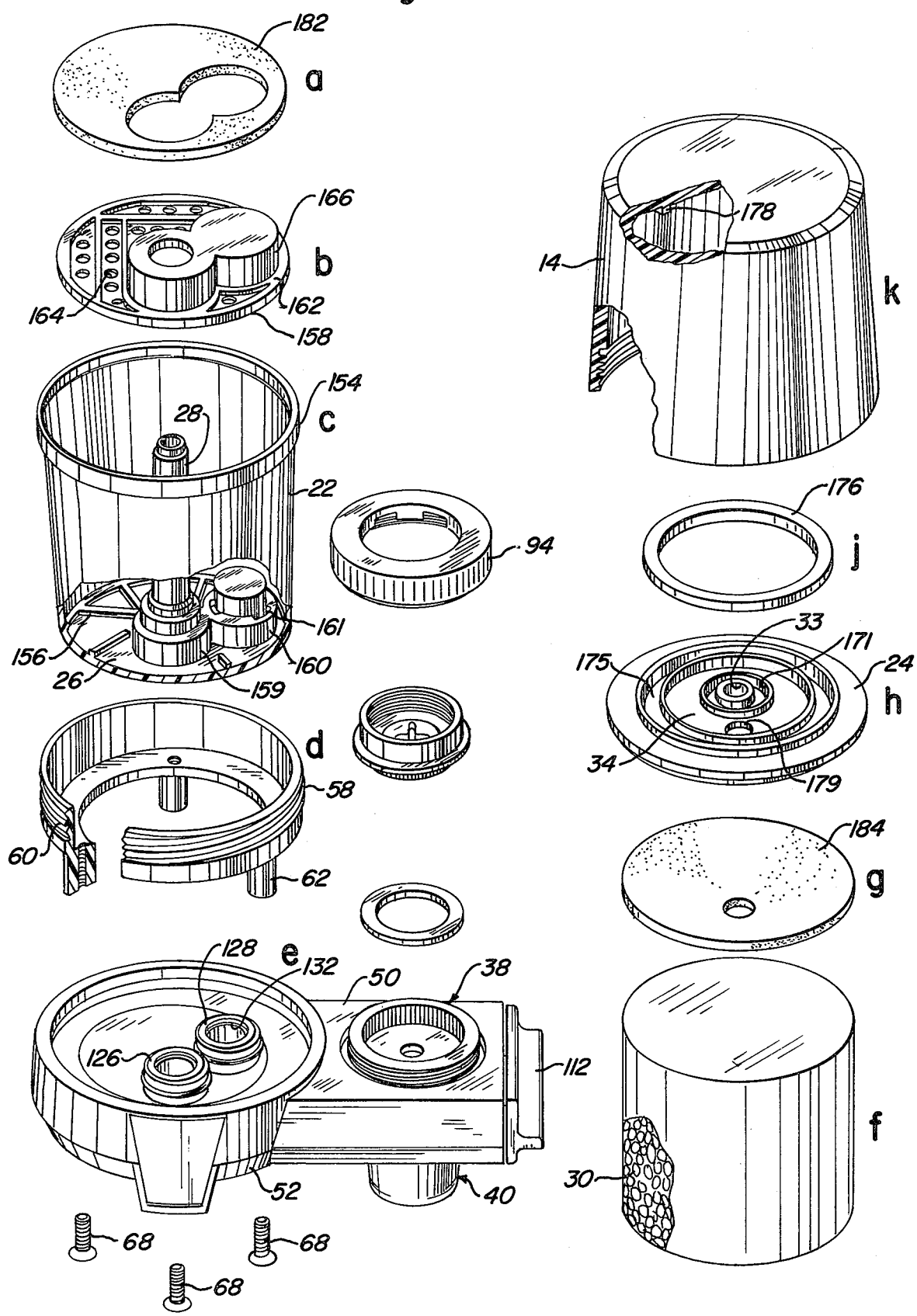
Fig_13

WATER PURIFIER APPARATUS

RELATED APPLICATION

The present application is a continuation-in-part of application Ser. No. 617,449, filed Sept. 29, 1975, now abandoned, and assigned to the same assignee as is the present application.

The present invention pertains to water purifier apparatus. More particularly, it relates to an apparatus that permits the selective distribution from a common source of either purified or non-purified water, adaptable to being semi-permanently attached in a fixed position and which is capable of utilizing the particular kind of filter cartridge disclosed and claimed in the above-cross-referenced application.

As already explained in that cross-referenced application, surveys have indicated that a significant percentage of water obtained from individual taps in the home and the like contains one or more bacteriological or chemical constituents that exceed limits set forth in standards issued by public health services. In some cases, such samples evidence a potential danger. Various studies have identified a need for improved systems to control at least aesthetically undesired concentrations of various minerals and other constituents as well as color, taste and odor. The problem is one of both preventing the transmission of disease or the like as well as in overcoming effects that may be adverse to the sensibilities of the user.

One prior answer has been a steadily increasing usage of bottled water. At the same time, there have been a number of entries into the marketplace of point-of-use purification devices. The latter have included in-line filters, under-the-sink filters, free-standing drink-size separate filter units and filter devices that attach to the conventional sink faucets or to the typical aerator secured thereto.

In general, a somewhat limited number of processes have been found to be capable of removing undesired materials from water. These include reverse osmosis, freezing, filtration, chemical oxidation, distillation, absorption on powdered charcoal, and absorption on granular activated carbon. Carbon filtration has been found to be particularly effective in removing detergents, insecticides, viruses, specific chemical pollutants and taste and odor pollutants. For example, carbon has long been used for the removal of chlorine from water in the brewing and soft drink manufacturing industries. Activated carbon removes tastes and odors from water by an adsorption process in which substances of one kind are accumulated on the surfaces of another. The activiated carbon has extremely large surface areas that make it efficient. The activation process produces pores that contribute substantially to increased surface area of the treatment. In some cases, the activated carbon has been treated with oligodynamic silver which acts as a bactericide and self-sanitizing agent.

One desirable location for a water purifier is in the vicinity of the kitchen sink in a conventional home. The addition of a water purifying apparatus has frequently meant the undesired occupation of counter space or undersink space or interference to convenient utilization. The above-cross-referenced application discloses apparatus that is particularly attractive for use in such an environment because it is adaptable for substitution in place of the more-or-less conventional vegetable spray often present as a part of the overall kitchen sink unit. While the apparatus of that application may be otherwise coupled to a source of water supply, as when a vegetable spray attachment is not present, the manner in which alternative coupling may be achieved can at least be inconvenient.

Several manufacturers have commercially marketed a kind of water filter that is intended for attachment to a conventional sink faucet, as mentioned above. Particularly when a vegetable spray hose or other separate source of water is not conveniently available, such a faucet-attachment unit often is appropriate. Such prior devices of this particular kind usually include a valve assembly for permitting the discharge of water directly from the faucet or through a filter cartridge as desired. For reasons of economy and avoidance of corrosion, the valve assembly, at least ususally, is constructed of plastic parts. In time, normal wear on the plastic material may result in undesired leakage.

It has also been observed that many of the different presently-available faucet-attachment kind of filter units are designed to accept a filter cartridge which must be manufactured specifically for each particular kind of unit. That is, the various different filter cartridges are not interchangeable.

It is a general object of the present invention to provide a new and improved water purifying apparatus which avoids disadvantages and otherwise undesirable features of prior apparatus for the same general purpose.

It is another object of the present invention to provide new and improved water purifying apparatus which is capable of utilizing a filter cartridge of the same kind produced and marketed for use in other types of water purifying apparatus such as those which are designed particularly for adaptation to a vegetable spray coupling.

A specific object of the present invention is to provide new and improved water purifying apparatus in which a valve, used for selection between purification and non-purification, is of long-lasting character.

A water purification device constructed in accordance with the present invention includes a housing that has a base portion and a generally-cylindrical cup-shaped cap removably secured to that base portion. Included in the base portion is an input fluid channel that communicates with one end of the chamber defined by the cap. An outlet fluid channel communicates with that same end of the chamber. A generally cylindrical filter cartridge is disposed within the cap and has a conduit which extends between its opposing end walls. The cartridge encloses a purification material contained in surrounding relationship to the conduit. An inlet opening is positioned to communicate from the input channel to the material, and an outlet opening is arranged to communicate from the material to the end of the aforementioned conduit remote from the outlet channel. The other end of the conduit is positioned so as to communicate with the outlet channel. Preferably, a control portion projects laterally from the base portion and includes an inlet coupling attachable to a source of water supply, an outlet passage and a valve assembly that permits selective control of the distribution of water as between the outlet passage and the inlet channel. In itself, the valve assembly desirably includes a housing that has a bore the diameter of which tapers longitudinally. Inlet and outlet ports are defined in respective space-opposed portions of the housing sidewall. A valve stem is sized and tapered longitudinally so as to be received within the bore. Longitudinally cut into the stem is a recess that permits fluid to flow from the inlet port outwardly from one end of the stem to the input fluid channel when the recess is aligned with that inlet port. An inset is cut laterally into the stem in a position generally opposite the longitudinal recess and in alignment between the ports. Also cut into the stem is a groove that surrounds the inset exclusive of the longitudinal recess. Finally, a resilient sealing member, such as a standard O-ring, is disposed in and throughout the groove so as to block fluid flow to the recess while permitting flow between the ports when the inset is aligned between those ports. To avoid presentation to the sealing member of a sharp edge between the bore and the inlet port, which may result from normal manufacturing operations, it further is preferable that the region of the bore in the vicinity of the inlet port is untapered.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

FIG. 1 is an perspective view of a water purification device embodying the present invention;

FIG. 2 is a side-elevational view of the device of FIG. 1;

FIG. 3 is a bottom plan view thereof;

FIG. 5 is a fragmentary cross-sectional view taken along the line 5—5 in FIG. 2;

FIG. 6 is a reduced cross-sectional view taken along the line 6—6 in FIG. 4;

FIG. 7 is a side-elevational of a part shown in FIG. 4;

FIG. 8 is a side-elevational view of the part of FIG. 7 rotated by 90° about its longitudinal axis and with certain parts removed;

FIG. 9 is a fragmentary cross-sectional view taken along the line 9—9 in FIG. 7;

FIG. 10 is a reduced rear cross-sectional view of a part shown in FIG. 4;

FIG. 11 is a cross-sectional view taken along the line 11—11 in FIG. 10;

FIG. 12 is a fragmentary cross-sectional view taken along the line 12—12 in FIG. 11; and FIG. 13 is an exploded view, composed of sub-component illustrations a-k, which depicts various details and indicates the nature of assembly of the overall device.

Figure 4:
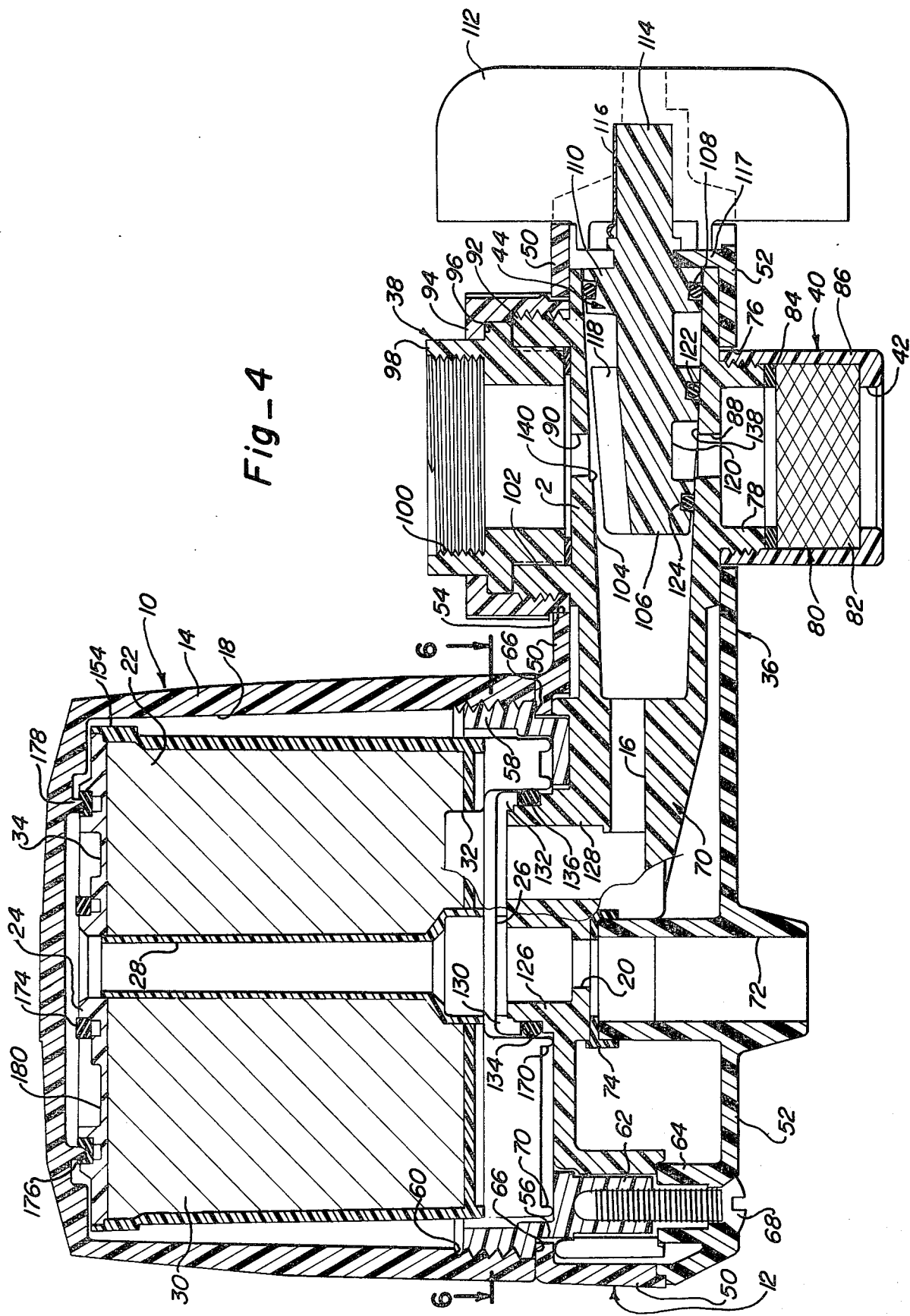
FIG. 4 is an enlarged vertical and longitudinally-centered cross-sectional view of that shown in FIG. 2, certain minor parts being in a different position.

As specifically embodied herein, a housing 10 generally has a base 12 and a generally-cylindrical cup shaped cap 14 that is removably secured to base 12. Included within base 12 is an input fluid channel 16 that communicates with one end of a chamber 18 defined in major portion by cap 12. Also communicating with that end of chamber 18 is an outlet fluid channel 20. Disposed within chamber 18, and held in place by cap 14, is a filter cartridge 22. Extending between the opposing end walls 24 and 26 of cartridge 22 is a conduit 28. Cartridge 22 encloses or contains a purification material 30 primarily of granulated activated carbon. The carbon preferably is mixed with silver loaded zeolite so as to inhibit bacteria growth within the filter. Material 30 surrounds conduit 28. Cartridge 22 includes an inlet opening 32 positioned in use to communicate with inlet channel 16 so as to permit fluid flow through filter material 30. Formed in outlet wall 24 of the cartridge is an outlet opening 33 arranged to communicate fluid flow from material 30 to the end of conduit 28 thereto adjacent in the bottom of a channel 34. Thus, filtered water is enabled to flow through conduit 28 and on through outlet channel 20, since the lower end of conduit 28 is positioned so as to communicate with the outlet channel.

Base 12 includes what may be called a control portion 36 which projects laterally to one side. Included in control portion 36 is an inlet coupling 38 that is attachable to a source of water supply and an outlet coupling 40 which defines an outlet passage 42. A valve 44 is carried within control portion 36 and serves to permit selective control of the distribution of water as between outlet passage 42 and inlet channel 16.

As particularly formed for present purposes, base 12 includes an upper cover member 50 mated to a lower cover member 52. One opening 54 in the upper cover member accomodates inlet coupling 38, while a second and larger opening 56 receives a flange 58. The latter is externally threaded as at 60 to receive corresponding internal threads on the lower end wall of cap 14 and thus secure the latter in place. In turn, flange 58 has integrally-formed downwardly-opening nuts 62 positioned so as to be in alignment with bosses 64 which project upwardly from lower cover member 52. Shoulders 66 formed on flange 58 just below threads 60 serve to clamp upper cover member 50 against lower cover member 52 upon the insertion through bosses 64 and tightening of screws 68.

Clamped between upper and lower cover members 50 and 52 is a valve body assembly 70. It will be observed that inlet channel 16 and outlet channel 20 are both formed into valve body assembly 70. Channel 20 terminates in an outlet flowway 72. When the overall device is assembled, the upper perimeter of flowway 72 is joined to assembly 70 by a seal 74 so as to form a continuation of outlet channel 20. Also formed in lower cover member 52 is an opening 76 which receives an externally-threaded boss 78 that projects downwardly from valve body assembly 70. As shown, an aerator unit 80, having an aeration element 82 fixed in place against a seal 84 and all enclosed within a shell 86, preferably is threaded upon boss 78. Leading to aerator 80 and formed in assembly 70 is an outlet port 88.

Opposite outlet port 88 is an inlet port 90 also formed in assembly 70 and located in the bottom of another outwardly projecting hollow boss 92. Input coupling 38 includes a retainer sleeve 94 threaded upon boss 92 and which has an inwardly projecting shoulder 96 that serves to secure a hollow faucet adaptor 98 in place. Adaptor 98 has internal threads 100 sized to fit the conventional faucet aerator threads on the faucet delivery end. Moreover, adaptor 98 is splined on its external lower periphery as at 102 so as to seat within a mating spline formed on the interior wall of boss 92. This arrangement permits attachment of the adaptor prior to mounting the overall unit. The splines enable selective but secure orientation of the unit.

Valve body assembly 70 includes a valve bore 104 which tapers so as to become more narrow in the region of ports 88 and 90 and in a direction toward input channel 16. Correspondingly tapered and seated within bore 104 is a valve stem 106. An O-ring 108 seated within a circumferential groove formed in a radial shoulder 110 on stem 106 serves to seal the valve stem within the outer and larger end of bore 104. A selecting knob 112 is mounted upon a necked-down outwardly-projecting shaft 114 which extends from valve stem 106, the knob being secured in place by means of a spring 116. Valve stem 106 is held longitudinally within bore 104 by means of an inwardly-projecting lug 117 formed in lower cover member 52.

Cut longitudinally into valve stem 106 is a recess 118. Recess 118, when aligned with port 90, permits fluid flow through inlet coupling 38 to pass into input channel 16, in progression outwardly from the inner end of stem 106. An inset 120 is cut laterally into stem 106 in a position at least generally opposite recess 118. Inset 120 is positioned in stem 106 so as to be in alignment between ports 88 and 90. Thus when valve stem 106 is rotated to a position 90 degrees different from that shown in FIG. 4, fluid is permitted to flow from port 90 to port 88. To complete a seal between recess 118 and inset 120, a groove 122 is cut into stem 106 so as completely to surround inset 120 while yet being exclusive of recess 118. A resilient O-ring 124 is then seated within groove 122. Therefore, O-ring 124 serves to block fluid flow to recess 118, while permitting fluid flow between ports 88 and 90 when inset 120 is aligned between the two ports.

It will be observed that the tapered wall of bore 104 must interesect the walls of ports 88 and 90. Such an intersection, without more, tends to leave a sharp edge positioned to damage O-ring 124. In the avoidance of such damage, the wall of bore 104 in the respective regions 138 and 140 immediately surrounding each of respective ports 88 and 90 is left untapered or aligned so as to be parallel with the longitudinal axis of valve stem 106. The tapered bore is thus blended into the untapered region by a radius or corner as indicated at 142 and 144, and the O-ring does not come into contact with the sharp area which exists at the junction between the port and the side wall of the bore.

Returning to the vicinity of the unit upon which cartridge 22 is mounted, cover member 50 includes a pair of upwardly projecting bosses 126 and 128. Upon the upper perimeter of each are a respective pair of rings 130 and 132 sonically welded in place and so shaped as to leave a circumferential external groove on each boss in which respective resilient O-rings 134 and 136 are situated.

As previously indicated, cartridge 22 includes an inlet wall 26 and an outlet wall 24. A locating ring 154 projects outwardly from outlet wall 24, extending at least generally around the periphery of that outlet wall. Internal spacing ribs 156 project inwardly from each end wall to hold the filter material in a spaced relationship in order to obtain a good flow profile. An apertured baffle plate 158 is spaced inwardly from inlet wall 26 and has a recess 166 to accomodate wells 159 and 160 that accept bosses 126 and 128. Baffle plate 158 and lateral openings 161 in well 160 permit the flow of water deflected by the baffle plate generally in the plane of inlet wall 26. That is, baffle plate 158 includes a plate 162 that has a plurality of apertures 164 and a recess 166 to accomodate wells 159 and 160 and, in turn, bosses 126 and 128. The combination insures that incoming water received through inlet 32 is uniformly distributed throughout the filter material. It will be observed that well 160 is in alignment with inlet opening 32 and that well 159 is at the lower end of conduit 28. These two wells 159 and 160 are so positioned as to be received upon respective O-rings 134 and 136. Cartridge 22 also includes locating ribs 170, projecting outwardly from the inlet wall, which insure proper seating and alignment of the inlet and outlet openings.

Within outlet wall 24 is a recess 171 formed into its exterior surface so as to encircle the upper end of opening 33. A resilient sealing element 174 is seated in recess 171. A second recess 175 is also formed into the exterior surface of outlet wall 24. A sealing element 176 is seated in recess 175. In use, a downwardly projecting rib 178 on the inner surface of cap 14 is aligned with seal 176. Further included in the exterior surface of outlet wall 24 is a third recess already defined as channel 34; it encircles recess 171 and is disposed between recesses 171 and 175, and conduit 28 terminates in an opening 179 in its bottom wall. The upper interior surface of cap 14 is formed as to permit water flowing upwardly through cartridge 22 to emerge into channel 33, pass over recess 171 and enter conduit 28. If desired for this particular embodiment, recess 171 and seal 174 may be eliminated. Inlet and outlet filters 182 and 184, preferably of felt, are sandwiched about the granulated filter material adjacent to each of the two end walls of cartridge 22.

It will be observed that the unit described and illustrated advantageously accepts and utilizes the very same filter cartridge also to be utilized in one of the units described and claimed in the parent application. Such adaptability leads to greater economy in the manufacture and sale of the cartridges. On the other hand, the embodiment of the present application enables the adaptation of a filter unit in cases where the devices of the parent application are not readily applicable or, for some reason, desirable.

The particular structural approach described herein is decidedly advantageous in that it permits a substantial minimization in the use of metallic parts. That, in turn, leads to economy of manufacture and longtime durability in the kind of usage envisioned.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A water purification device comprising:
   a housing having a base portion and a generally-cylindrical cup-shaped cap removably secured to said base portion, said base portion including an input fluid channel communicating with one end of the chamber defined by said cap and an outlet fluid channel communicating with said one end of said chamber;
   a generally cylindrical filter cartridge disposed within said gap and having a conduit extending between its opposing end walls, said cartridge including a purification material contained in surrounding relationship to said conduit and having an inlet opening positioned to communicate from said input channel to said material and an outlet opening arranged to communicate from said material to the end of said conduit remote from said outlet channel with the other end of said conduit being positioned to communicate with said outlet channel;

a control portion projecting laterally from said base portion with said control portion including an inlet coupling attachable to a source of water supply, an outlet passage, and valve means for selectively controlling the distribution of water between said outlet passage and said inlet channel;

and said valve means further including:
- a body having a bore the diameter of which tapers longitudinally;
- means defining inlet and outlet ports in respectively space-opposed portions of said body;
- a valve stem sized and tapered longitudinally to be received within said bore;
- a recess cut longitudinally into said stem for permitting fluid to flow from said inlet port outwardly from one end of said stem when said recess is aligned with said inlet port;
- an inset cut into said stem in a position generally opposite said recess and in alignment between said ports;
- a groove cut laterally into said stem and surrounding said inset exclusive of said recess;
- and a resilient sealing member disposed in and throughout said groove to block fluid flow to said recess, while permitting fluid flow between said port, when said inset is aligned between said ports.

2. An assembly as defined in claim 1 in which the region of said bore in the vicinity of said inlet port is untapered so as to preclude presentation to said sealing member of a sharp edge between said bore and said inlet port.

3. As useful in a water purification device for diverting water either through a filter medium or directly in by-pass thereof, a valve assembly comprising:
- a body having a bore the diameter of which tapers longitudinally;
- means defining inlet and outlet ports in respectively space-opposed portions of the sidewall of said body;
- a valve stem sized and tapered longitudinally to be received within said bore;
- a recess cut longitudinally into said stem for permitting fluid to flow from said inlet port outwardly from said one end of said stem when said recess is aligned with said inlet port;
- an inset cut into said stem in a position generally opposite said recess and in alignment between said ports;
- a groove cut laterally into said stem and surrounding said inset exclusive of said recess;
- a resilient sealing member disposed in and throughout said groove to block fluid flow to said recess, while permitting fluid flow between said ports, when said inset is aligned between said ports;
- and the region of said bore in the vicinity of said inlet port being untapered so as to preclude presentation to said sealing member of a sharp edge between said bore and said inlet port.

* * * * *